Dec. 18, 1956  B. D. MILLER  2,774,104
MOLDING AND DISPENSING OF PLASTIC MATERIALS
Filed July 15, 1952  4 Sheets-Sheet 1
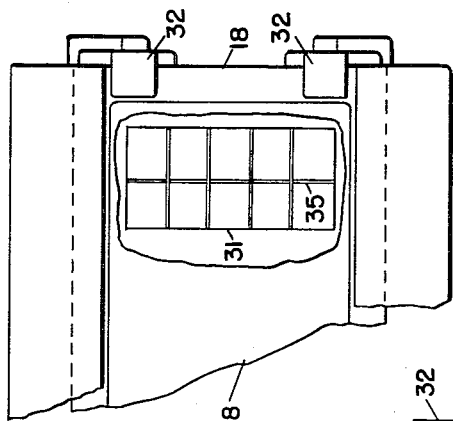
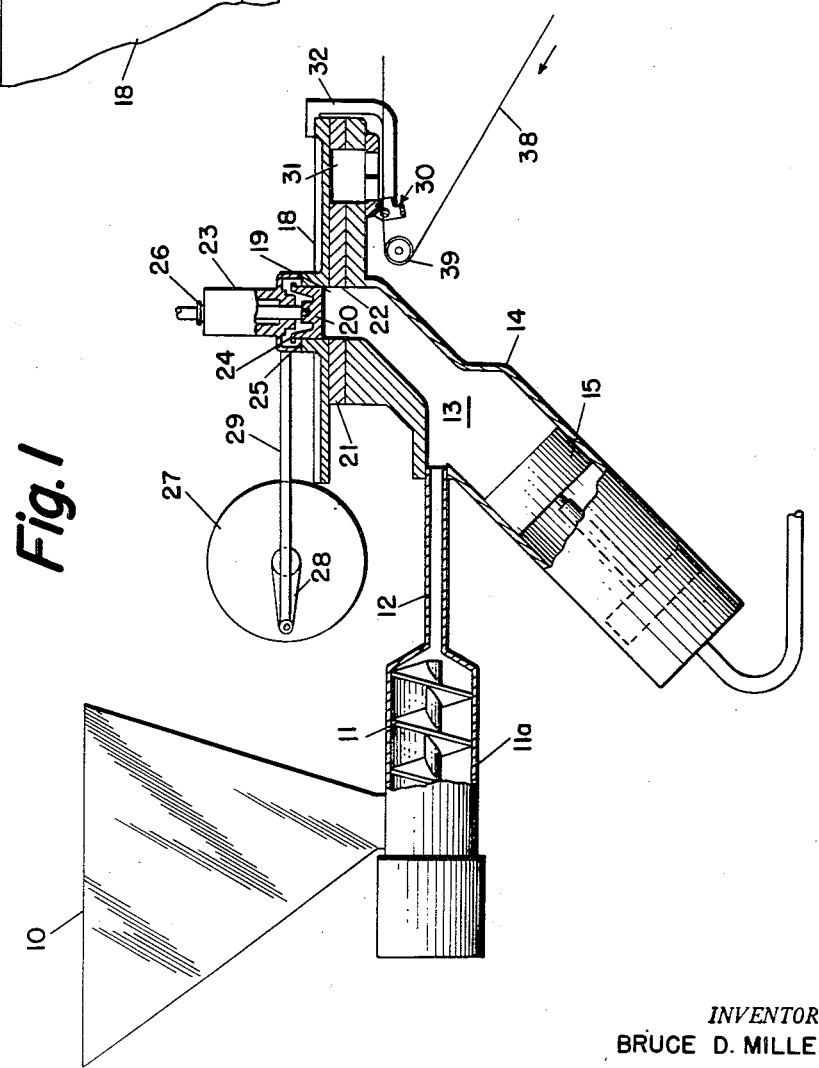
INVENTOR.
BRUCE D. MILLER
BY
Woodcock and Phelan
ATTORNEYS Dec. 18, 1956  B. D. MILLER  2,774,104
MOLDING AND DISPENSING OF PLASTIC MATERIALS
Filed July 15, 1952  4 Sheets-Sheet 2

INVENTOR.
BRUCE D. MILLER
BY
Woodcock and Phelan
ATTORNEYS

Dec. 18, 1956  B. D. MILLER  2,774,104
MOLDING AND DISPENSING OF PLASTIC MATERIALS
Filed July 15, 1952  4 Sheets-Sheet 3

*INVENTOR.*
BRUCE D. MILLER
BY
Woodcock and Phelan
ATTORNEYS

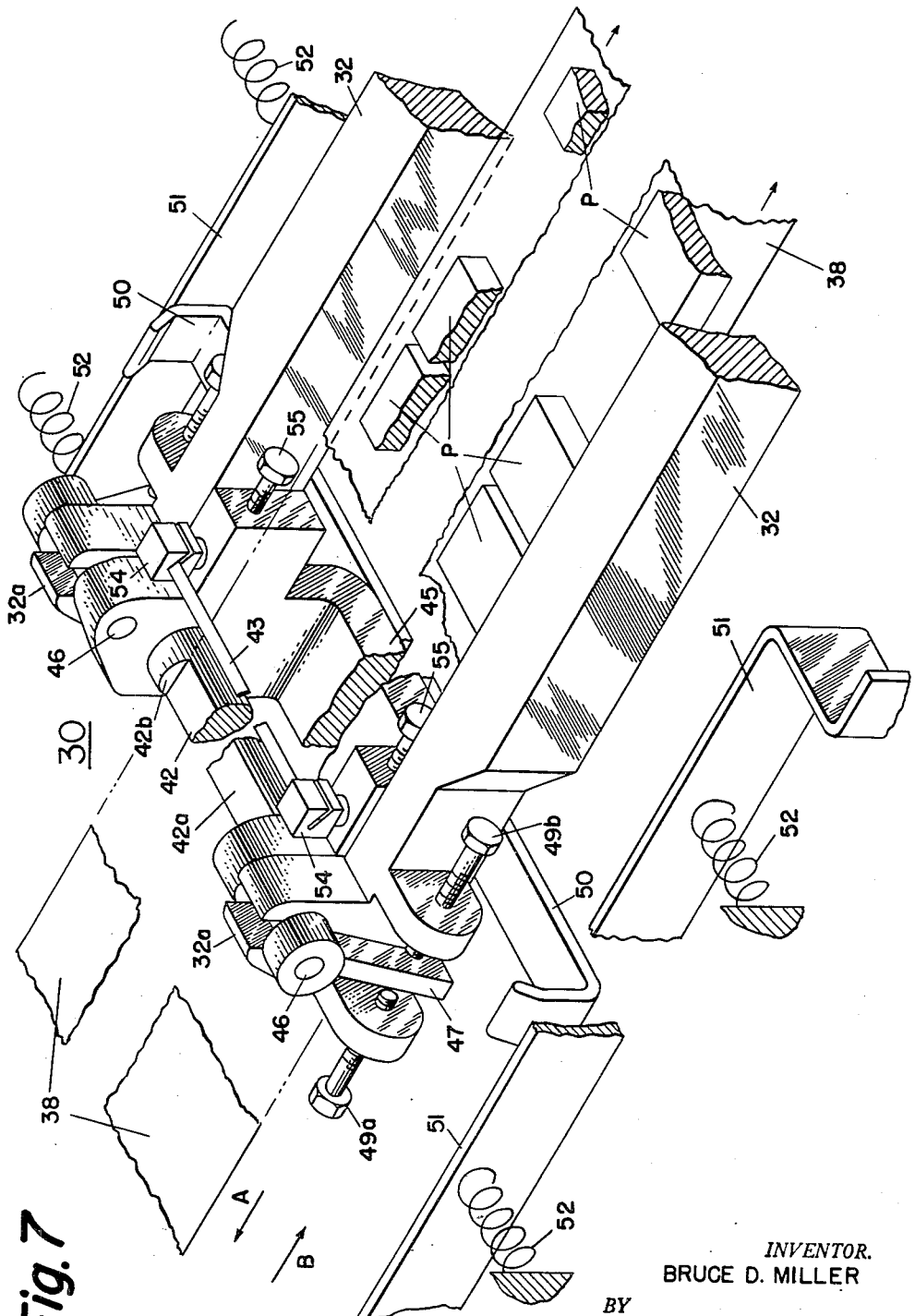

United States Patent Office 2,774,104
Patented Dec. 18, 1956

2,774,104

MOLDING AND DISPENSING OF PLASTIC MATERIALS

Bruce D. Miller, Louisville, Ky., assignor, by mesne assignments, to National Cylinder Gas Company, Chicago, Ill., a corporation of Delaware Application July 15, 1952, Serial No. 298,912

11 Claims. (Cl. 18—5)

This invention relates to methods of and apparatus for processing and operating on materials of plastic form suitable for molding into units of predetermined shape and has for an object the provision of methods of and apparatus for molding and dispensing the material in units of selective size, weight and volume and in a form suitable for subsequent packaging without further handling. Included in the classes of materials which may be processed in accordance with this invention are soap, cheese, margarine, butter and the like. More particularly this invention relates to methods of and apparatus for forming plastic material into individual units, such for example, as accurate weight prints or small individual service portions of margarine or butter commonly referred to in the restaurant trade as "pats", and for automatically dispensing these units from a mold in a form suitable for packaging and for subsequent use by the consumer.

Various methods and apparatus have been utilized heretofore for preparing units of the plastic material. For example, one method of preparing the units or pats has been to cut the latter from larger blocks such as from one-quarter pound sticks or one-pound prints of margarine or butter. This operation has been performed by both hand-operated devices and commercial machines designed to produce and package pats for retail sale. In one type of machine a quarter-pound stick is laid on its side and a cutting blade is moved transversely of the stick to cut the stick into a plurality of pats of desired thickness. The pats are either allowed to fall onto a supporting paper after which they are rearranged into the desired positions or the stick itself rests on a paper during the cutting operation and the pats when cut therefrom will be resting on an edge, thus necessitating their rearrangement into separate layers for subsequent packaging. In other types of machines a slab of the material is placed on a sheet of paper ultimately used to separate the layers of pats in the package and a cutting die having a plurality of blades is then pushed down through the slab to produce pats of the desired size and shape. In some of the machines the cutting blades have been heated in order to assist in cutting the material. However, the heating of the cutting blades has the disadvantage that an excessive amount of the material melts and will spread over the supporting paper. Various other forms of apparatus have been utilized for preparing pats. However, in each of the prior machines there has been required multiple handling of the product, and thus it has been extremely difficult to maintain accurate weight and uniformity of shape in the finally prepared pats.

In accordance with the present invention, the disadvantages of the prior arrangements have been entirely overcome. The uniformity of the final units or pats as to shape, thickness and weight may be very closely controlled by a simple adjustment of the machine. The product is deposited directly upon a sheet of paper before cutting and in which it may be subsequently wrapped. In addition, no operations which will cause deformation of the pats or contamination of the paper with the material are carried out after the material is extruded into the desired units as they are in contact with the supporting paper during the subsequent severing from the extrusion cavity. Thus, upon completion of the severing operation the pats are properly spaced on the supporting paper ready to be delivered to the wrapping machine without further handling. Furthermore, the machine may be readily adapted to form accurate weight prints of much larger size than the individual pats and deposit the prints upon a paper sheet for subsequent wrapping.

In one form of the invention the preferred method comprises forming a portion of a quantity of plastic material into a series of units of predetermined shape and spacing, moving a wrapper surface into adhering contact with the series of spaced units, and severing the series of spaced units from the remainder of the quantity of plastic material while the wrapper surface is stuck to the material thereby maintaining the predetermined spacing after severing.

Also in a preferred form of the invention as applied to a machine for molding and dispensing plastic material such as butter, margarine or the like, the preferred apparatus comprises a mold including an inlet and outlet adapted to receive therein the plastic material, conveyor means spaced from the outlet of the mold, means for expelling a predetermined quantity of the plastic material from the outlet of the mold, cutting means movable across the outlet of the mold in a path substantially parallel to the conveyor means for detaching the predetermined quantity of plastic material expelled from the mold, and means cooperating with the conveyor for lifting the conveyor into adhering contact with the predetermined quantity of material expelled to engage the latter as it is being detached in avoidance of deformation of the expelled material.

Further, the invention also provides for an attachment for a machine for molding plastic material and expelling it from a mold onto a conveyor comprising a device including cutting means for detaching plastic material from the mold, and lifting means cooperating with the cutting means for lifting the conveyor into contact with the material and engaging the conveyor in stationary contact with the material as it is being detached from the mold, preventing longitudinal shifting and deformation.

For further objects and advantages of the invention and for a more detailed understanding of the invention, reference is to be had to the following description taken in conjunction with the accompanying drawings, in which:

Fig. 1 is a partly diagrammatic and partly sectional view of a processing apparatus or system embodying the present invention;

Fig. 2 is a partial plan view taken at the right-hand end of Fig. 1 and showing the grids of a die at the bottom of the mold as viewed through a cut-away portion above;

Fig. 7 is a perspective view showing the severing or detaching device on enlarged scale.

Figure 3:
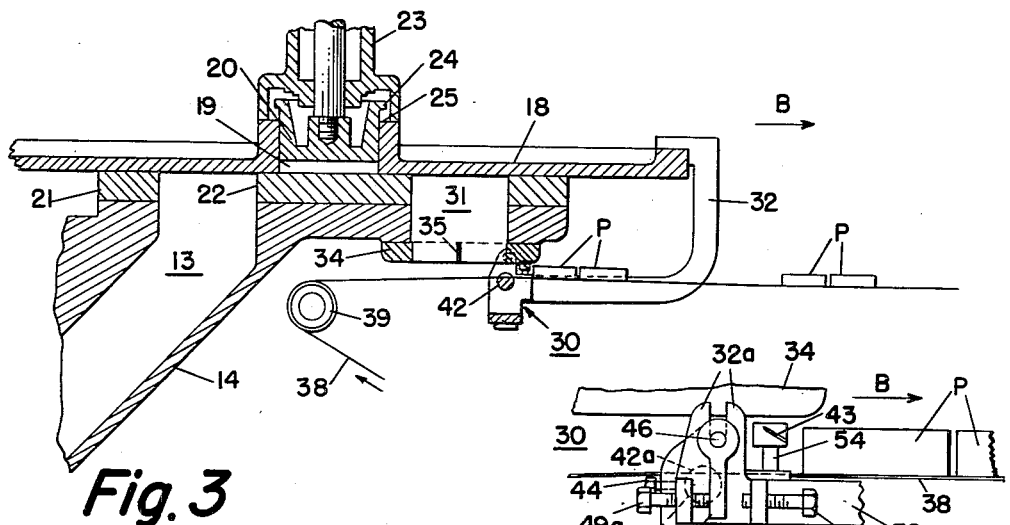
Fig. 3 is an enlarged sectional view of certain parts of the system shown in Fig. 1, the parts being shown in the position they occupy when the movable mold has been filled and is at a point intermediate the ends of its stroke.

Referring to Fig. 1, there is shown diagrammatically and partly in section a system for molding and dispensing small individual units of margarine and, of course, it is understood that the features of this system also are applicable to separate portions or units of other plastic materials such as butter, cheese, soap, lard, or the like. As shown in Fig. 1, the plastic material or margarine is fed into the molding apparatus from a hopper 10. Before depositing the material in the hopper 10, the material preferably is passed through a suitable processing apparatus (not shown) which may be of the general type disclosed in Bottoms et al. Patent No. 2,013,025, and which subjects the material under pressure to cooling and concurrent agitation. After the material has been solidified by chilling and working and thus brought to the desired texture, the material may then be deposited in the hopper 10. From the hopper 10 the margarine or other plastic material is drawn downwardly into the screw chamber 11a and is fed into the molding apparatus by means of a feed screw 11 through a conduit 12 which connects the hopper 10 and screw chamber 11a with the filling pocket or chamber 13 of the molding apparatus. If desired, the margarine may be fed directly to the tube 12 from the processing apparatus, eliminating the hopper 10.

The feed screw 11 may be driven either intermittently or continuously; however, the preferred embodiment as hereinafter described makes provision for continuous operation of the feed screw. The feed screw 11 develops a substantial pressure on the margarine whereby the air pockets are forced out of the material while it is in the screw chamber 11a, thus permitting the margarine to flow under pressure through conduit 12 as a substantially uniform continuous plastic mass into the molding apparatus.

The molding apparatus as shown in Fig. 1 comprises a hollow casting 14 having a chamber 13, the lower end of which is provided with a movable wall in the form of a piston 15. The feed screw 11, preferably is driven continuously and the movable piston 15 permits the margarine or plastic material to be forced into the chamber 13 at a constant rate under the pressure of feed screw 11. At the opposite or outlet end of chamber 13, there is provided a slidable mold plate 18 having a cavity or sliding pocket 19 therein and which is best seen in Fig. 3. That cavity upon reciprocation of plate 18 is intermittently moved into and out of communication with chamber 13. When the cavity 19 is in communication with chamber 13, the margarine will be caused to flow under pressure into the cavity 19 and against the print block or plunger 20 that forms the top of mold cavity 19. Since the supply of material from feed screw 11 to the chamber 13 preferably is continuous and as the withdrawal from the chamber 13 to cavity 19 is intermittent and as the plastic material is ordinarily substantially non-compressible, the chamber 13 with movable wall 15 is so designed that it retains the material under the substantially constant pressure and the capacity of chamber 13 may fluctuate. For further description of arrangements generally similar to the foregoing for supplying plastic material to a chamber under pressure, reference may be had to Miller Patents Nos. 2,329,287 and 2,329,288.

At the outlet end of the chamber 13 that intermittently is in communication with cavity 19, there is a stationary horizontal wear plate 21 which may be integral with or secured to the casting 14 and is adapted to support the slidable mold plate 18. As shown in Figs. 1 and 3–6, the stationary plate 21 is provided with an opening 22 that is in permanent registry with and forms a continuation of chamber 13. The upper surface of plate 21 is machined smooth for close engagement with a similarly machined surface on the bottom of slidable mold plate 18. Sliding plate 18 is provided with a centrally located rectangular opening for forming the cavity or sliding pocket 19 which is adapted to be closed at the top by plunger or print block 20. Both print block 20 and cavity 19, preferably have a rectangular shape similar to the rectangular shape of mold cavity 31 shown in Fig. 2.

The mold cavity 19 is adapted by adjustment of the travel of plunger 20 to have a depth equal to the desired thickness of the portions or pats of the material to be dispensed by the machine. As may be seen, the plunger 20 is arranged for vertical movement within cavity 19. The vertical movement of plunger 20 may be produced by any suitable means such for example as a double acting piston within a hydraulic cylinder, the latter having been illustrated diagrammatically in Fig. 1 at 23. When plunger 20 is in its down position, Fig. 4, cavity 19 will have zero volume and the face of plunger 20 will be in alignment with the smooth bottom surface of slidable plate 18. The extent of downward movement of plunger 20 may be controlled by engagement of shoulder or flange 24 on plunger 20 with shoulder 25 on plate 18. The upward movement of the print block or plunger 20 may be limited by means of an adjusting screw 26 on the top of the hydraulic cylinder 23, Fig. 1.

After the margarine has been forced from chamber 13 into the measuring cavity 19 to the required depth, the molding unit including mold plate 18, cavity 19, and plunger 20 is adapted to be moved to the right, as viewed in Fig. 1, by suitable reciprocating means. For example, the reciprocating means for moving the molding unit between the positions shown in Figs. 1 and 6 and Fig. 4 may comprise a crank arm 28 which may be driven from a suitable driving means such as an electric motor with appropriate gearing diagrammatically illustrated as circle 27, the crank arm 28 being connected to the aforementioned unit by a connecting link 29. Also arranged for movement with the mold plate 18 is a severing or detaching device 30 for cutting extruded plastic material extruded from cavity 31 and depositing the extruded material on a conveyor and which forms a part of the present invention and which will be later described in detail.

As will be noted, Fig. 1, extrusion pocket 31 is disposed to the right of chamber 13 and comprises alignment rectangular openings, Fig. 2, formed in casting 14 and stationary plate 21. Through the reciprocating drive for the molding unit, there will be alternate communication of cavity 19 with the extrusion pocket or mold cavity 31 and chamber 13. As cavity 31 has a greater depth than the movable mold cavity 19 the former will act as a storage cavity until it has been filled to a predetermined depth. The severing device 30 is arranged to be carried by arms 32 which are supported by mold plate 18 and serve as a carriage in carrying the severing device 30 for reciprocation underneath extrusion pocket 31.

In order to divide the plastic material into a plurality of separate portions, there may be provided at the bottom or outlet of cavity 31 a die 34, Fig. 3, which in turn is provided with grids 35, the latter being disposed to divide the plastic material into the desired portions. While the grids 35 may be arranged to separate the plastic material into portions of various configuration, they preferably are arranged in rectangular form to divide the material into separate portions of like shape and size such as the individual portions of butter or margarine used by the restaurant trade and commonly referred to as pats P. Such an arrangement of the grids 35 may be seen in Fig. 2 wherein a portion of mold plate 18 has been cut away so that the grid plates 35 disposed at the bottom of cavity 31 may be seen. Of course, if it is desired to form large size prints such as one-quarter pound blocks or sticks, the grids may be eliminated entirely and the shape of the die 34 altered to produce any desired size and shape of print.

Beneath the outlet of cavity 31 and die 34, there is arranged a movable conveyor 38 which is adapted to be intermittently moved in timed relation with the movement of mold plate 18. The conveyor 38 is adapted to receive the margarine as it is dispensed from the cavity 31 and thus preferably may comprise a flexible strip or web of wrapping paper from a supply roll, not shown. The paper, preferably of the wax or parchment type, may be fed upwardly from a supply roll, not shown, over roller 39 and to the right below cavity 31 as shown in Figs. 1 and 3–6. If desired, individual sheets or wrappers, carried by a flexible conveyor may be substituted for the continuous strip, and the word "conveyor" used herein and in the claims is meant to include such arrangements.

Before describing the severing or detaching device 30 in detail, a brief description of the general operation of the molding apparatus will be given. Referring to Fig. 1, the slidable mold plate 18 is at the extreme left end of its movement and the cavity 19 in plate 18 is in register with the outlet of filling chamber 13. The print block or plunger 20 at the top of cavity 19 has been raised to its highest position as predetermined by the aforementioned adjusting screw 26 and a quantity of margarine or other plastic material has been moved into the cavity 19 under print block 20 by the pressure of feed screw 11. The print block 20 may be forced upwardly by the pressure of the material from feed screw 11 alone or its upward movement may also be aided through the operation of the double-acting piston within hydraulic cylinder 23. As the print block 20 approaches the top of its stroke, the molding unit including the plate 18, print block 20 and cavity 19 is moved to the right toward the extrusion pocket 31 by means of the crank arrangement including crank arm 28 and connecting link 29 as mentioned above. Preferably, upward movement of the print block 20 starts as soon as the cavity comes into communication with the chamber 13 and may continue as long as that communication is maintained.

As the sliding cavity 19 moves away from the filling chamber 13, filling pocket 19 in cooperation with plate 21 shears off and carries with it from the mass of margarine in chamber 13 an amount of margarine exactly equivalent to the amount in one layer of pats, or single print as the case may be, to be formed at extrusion cavity 31. The margarine cannot escape from the cavity 19 under the print block 20 because the lower surface of the movable plate 18 and the upper surface of the stationary wear plate 21 are machined smooth so that an effective seal is provided between the relatively moving surfaces. In Fig. 3 the parts have been illustrated with the unit at about its mid-point in its movement to the right. The slidable plate 18 then covers both the outlet of chamber 13 and the inlet of the extrusion cavity 31.

Figure 4:
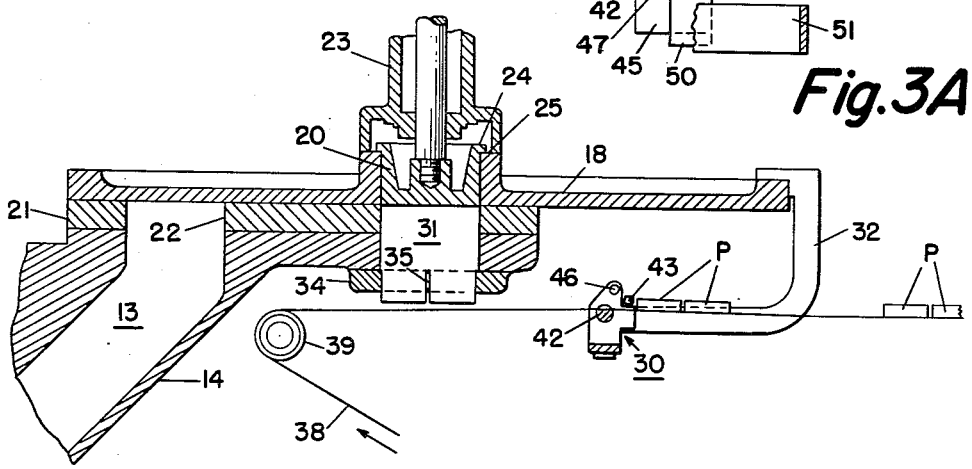
Fig. 4 is a view similar to Fig. 3 showing the mold at the right-hand end of its stroke with a predetermined quantity of the plastic material presesd through the mold.

With the parts positioned as shown in Fig. 4, the sliding pocket 19 of plate 18 has been moved to its extreme right-hand position with the pocket 19 and the print block 20 in axial alignment directly over the extrusion cavity 31. The print block 20 has been forced to its lowest position, determined by the engagement of the flange or shoulder 24 on the print block 20 with the shoulder 25 of the sliding plate 18, by means of the aforementioned double-acting piston within the hydraulic cylinder 23. During this downward movement of print block 20, all of the margarine carried from the filling pocket 13 by the sliding pocket 19 is forced into the extrusion pocket 31 and an equivalent amount of the stored margarine is expelled or extruded through the die 34 at the bottom of extrusion pocket 31. The print block 20 in its lowermost position, Fig. 4, has its bottom face flush with the top surface of the stationary wear plate 21 so that when the sliding pocket 19 moves from the position illustrated in Fig. 4 to the position illustrated in Fig. 5, it will have zero volume and no margarine will be retained under the print block 20. Thus, no air cavity or stagnant space can occur in the sliding pocket at any time during operation of the machine.

Figure 6:
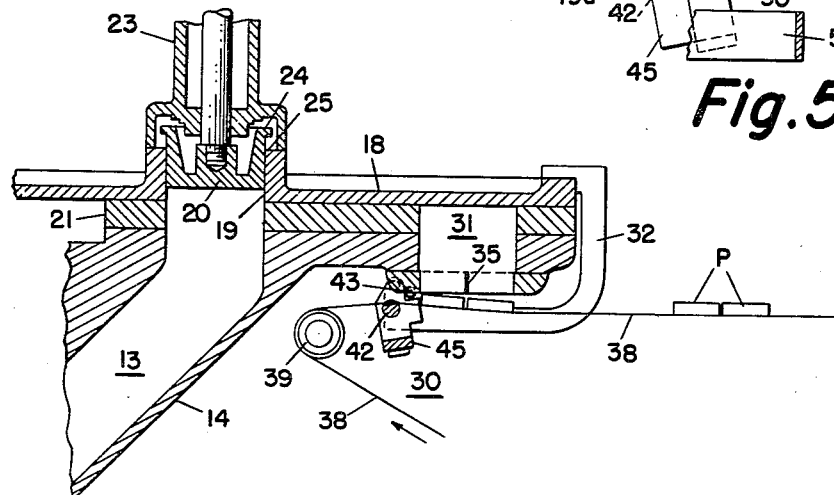
Fig. 6 is a view similar to Figs. 3, 4 and 5 but with the mold again in its original position as shown in Fig. 1, the severing device having completed the operation of detaching the predetermined quantity of the plastic material in the bottom of the mold.

In Fig. 6 the various parts have been illustrated on a large scale but in the same positions as shown in Fig. 1, thus illustrating that the various parts have again assumed their original positions and the above cycle of operations is ready to be repeated.

The operation and construction of a preferred embodiment of the severing or detaching device 30 will now be described in detail. As previously pointed out, a conveyor 38 preferably in the form of a continuous strip or web of paper is arranged to travel horizontally and a short distance below the underside of the extrusion pocket 31. The paper is advanced with a step-by-step movement by any suitable mechanism, not shown, such as a Geneva drive, which is so timed that forward movement of the conveyor formed by the paper web 38 is halted when the paper is raised slightly and brought into contact with the underside of the layer of pats extruded from die 34. As may be seen in Fig. 5, the member 42 for moving the paper into contact with the layer of pats to be severed from below the surface of cavity 31 is in advance of and below the cutting member 43. Thus, the paper will be brought into contact with the underside of the layer of pats extruded from die 34 before these pats are severed from the remainder of the margarine within the extrusion pocket 31. The cutting member 43 and the paper-lifting member 42 are in opposed relation throughout the cutting stroke, thus providing for progressive lifting of the paper into contact with the layer of pats as the protruding material is being progressively severed or detached from the lower face of die 34. The foregoing feature aids in avoiding deformation of the pats during the severing-wrapping operation by preventing shifting of pats while being severed and maintaining position during wrapping operation. As the pats are severed they drop away from the mass in the die 34 carrying the paper with them. This serves to prevent re-adhesion to the mass after cutting. Forward movement of the paper does not begin again until the layer of pats has been cut and dropped away from the remaining mass of margarine within cavity 31 (see Figs. 1 and 6). In this manner the pats are not deformed nor the paper smeared when they are cut from the mass within cavity 31 by the cutting member 43. Thus, a clean line of separation between the individual pats on the paper is maintained and the pats are in proper position for subsequent wrapping by severing the web in-between groups of pats and folding the edges around the pats.

The full length of stroke of the severing or detaching device 30 is preferably the same as the horizontal displacement of print block 20 between the positions shown in Figs. 4 and 6. Accordingly, there may be provided a support underneath the strip of paper to the right of the severing device 30 as illustrated in Fig. 4, the support being so located slightly below the level of the bar 42 as to allow the above described dropping away of the severed pats and still to prevent the flexible paper web from sagging excessively under the weight of the pats of margarine after they have been severed from the remainder of the mass within extrusion pocket 31. Any suitable support may be provided such for example as a plurality of horizontally disposed parallel rods which may extend parallel to the path of movement of the paper; however, the support has been omitted from the drawings for purposes of clarity.

Referring to Fig. 7, the detaching or severing device 30 has been illustrated on an enlarged scale and with the central portion thereof broken away to enable the showing of both ends of the apparatus in a single view. The strip of paper upon which the pats are to be placed has been illustrated in its proper position with respect to the detaching device 30. As may be seen, the member 42 that engages the strip of paper or conveyor 38 comprises a solid bar having a flat face 42a machined thereon. The strip of paper 38 is adapted to pass over flat face 42a and between the shoulders 42b, only one of which is visible on Fig. 7. The bar 42 extends across the upper portion of a U-shaped member 45 which also carries the cutting member 43, but the bar is spaced below and slightly ahead of the latter. The ends of bar 42 preferably are circular to permit rotation of the bar for angular adjustment of the paper-engaging face 42b relative to the paper web. The bar 42 may be locked in place after adjustment by means of screws 44, Figs. 5A and 3A.

The U-shaped member 45 is carried by a pair of arms 32 which served as a carriage for moving the detaching device 30 in unison with reciprocating movement of the slidable mold plate 18. The U-shaped frame member 45 is mounted for pivotal movement with respect to arms 32 by means of pins 46 which project horizontally from the upper ends of the sides of the U-shaped member 45 and are adapted to be received by the bifurcated ends 32a of arms 32. In order to limit the pivotal movement of the severing device 30, each of the pins 46 may be provided with an ear 47 which is disposed for limited movement between a pair of adjustable stops 49a, 49b carried by each of the arms 32. In order to bias the detaching device in one position upon forward movement of the device and in a second position upon reverse movement, there is provided a member or friction shoe 50 carried by the U-shaped frame member 45 and adapted to engage a spring-biased member 51 supported alongside the path of movement of the severing device 30. Member 51 in cooperation with springs 52 provides frictional contact with the member 50 during both the forward and reverse stroke of the carriage including arms 32. When the carriage is moved in the direction of arrow A preparatory to cutting off a layer of pats P, the ear 47 will be biased against stop 49b due to the frictional contact between members 50 and 51. Upon movement of the carriage in reverse direction as indicated by arrow B, the ear 47 will be held against stop 49a due to the frictional contact between members 50 and 51.

The pivotal action referred to in the preceding paragraph has a two-fold purpose. On the forward movement of the carriage with severing device 30, direction of arrow A, Figs. 5 and 7, the U-shaped frame member 45 is rotated above pivot pins 46 to the position shown in Fig. 5A. Fig. 5A is a fractional view on enlarged scale of the detaching or severing device 30 of Fig. 5. As may be seen, the flat surface 42a of paper-lifting bar or member 42 has been moved against the strip of paper or conveyor 38, thus raising the latter against the bottom surface of the layer of pats P, Fig. 5, being severed from the mass within cavity 31 in advance of the severing blade 43. The rotation of the U-shaped member 45 raises the position of the cutting member 43 which may be in the form of a wire, or preferably in the form of a cutter blade; and when of the latter form, the rotational movement provides a tilting of the cutter blade. Other arrangements such as cam tracks and followers may be employed to raise the cutting and paper-lifting members on one stroke and lower them on the other, but the above described arrangement is preferred because of its simplicity in construction. Another arrangement which has proved satisfactory is to utilize a movable platen beneath the extrusion die which raises the paper into contact with the pats just before the beginning of the severing stroke and then drops away.

Figure 3A:
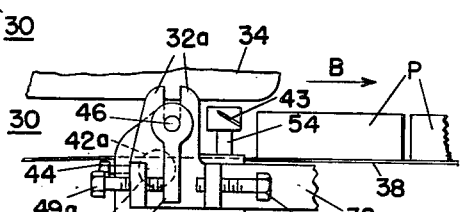
Fig. 3A is a fractional view on an enlarged scale of the severing device as it is positioned in Fig. 3.

When the carriage with its severing device 30 reaches the end of its stroke as shown in Fig. 6, it is then ready for reverse movement as in the direction illustrated in Fig. 3 and by arrow B in Fig. 7. On the return movement of the severing device 30, the U-shaped frame member 45 will be rotated in the opposite or clockwise direction and due to the inertia effect and the frictional drag provided by members 50 and 51, the ear 47 will be moved against stop 49a as shown in Fig. 3A. As may be seen in Fig. 3A, the stop 49a prevents the U-shaped member 45 from being rotated as far in a clockwise direction as it was previously permitted to be rotated in a counterclockwise direction before the ear 47 engaged stop 49b. The purpose of this provision is to lower the position of the cutting member 43 so that it will not scrape against the bottom surface of die plate 34 on the return stroke, Figs. 3 and 3A. On the return stroke, the layer of pats P which has been severed from below the die 34 is preferably carried away from the die by the flexible paper conveyor 38 in advance of the returning cutter.

As heretofore mentioned, the cutting member 43 may be either in the form of a wire or a blade as illustrated in Fig. 7. In order to provide for vertical adjustment of the cutting member 43, it may be held at the ends by the slotted heads of pins 54 which are in turn received within openings in the U-shaped frame member 45. The position of the pins 54 in the openings in the frame member 45 may be controlled by means of threaded members 55 which extend into the frame member 45 and engage the pins 54. The cutting member 43 is so adjusted that when the U-shaped frame member 45 is pivoted thereby bringing member 47 against stop 49b to raise the cutting member 43 to its highest position, the cutting member 43 will then rub against the bottom surface of the die plate 34 disposed at the bottom of extrusion pocket 31. When the cutting member 43 is in the form of a flat knife blade, it preferably is set at an angle with respect to the horizontal or bottom surface of die 34 to plow the layer of pats away from the die plate.

While each of arms 32 of the reciprocating carriage for the detaching or severing device 30 has been illustrated with stops 49a and 49b for limiting the rotational movement of the U-shaped member 45, it is to be understood that the aforementioned construction may be provided on only one of the arms 32. Similarly, only one set of frictional drag members 50 and 51 may be provided if so desired.

Summarizing the foregoing, the dispensing operation is as follows: As shown in Fig. 4, the margarine has been forced downwardly through extrusion cavity 31 by print block 20. The margarine extends below the surface of die 34 a distance equal to the predetermined thickness of the pats to be formed. The grids 35 of die 34 have divided the layer of margarine of predetermined thickness into a plurality of rectangles of predetermined area. With the parts positioned as illustrated in Fig. 4, the strip of paper or margarine conveyor 38 is in a stationary position and the carriage with severing device 30 is ready to move to the left for severing the layer of pats from the remainder of margarine within the cavity 31.

Figure 5:
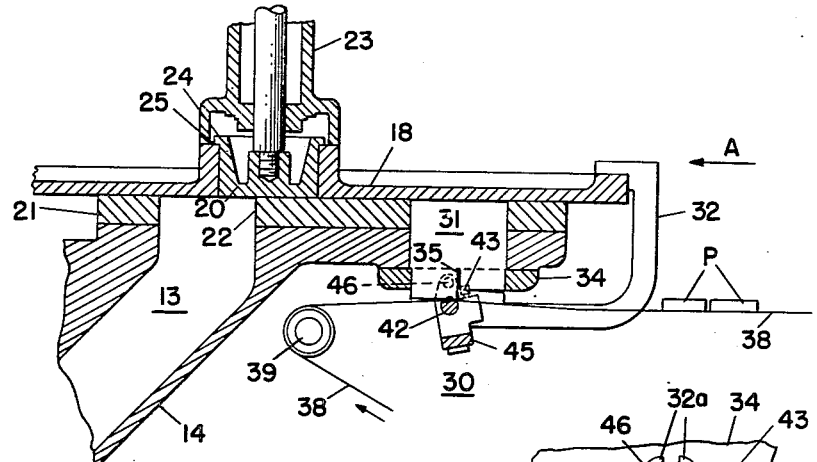
Fig. 5 is a view similar to Figs. 3 and 4 showing the mold nearly to the opposite end of its stroke with the severing device in the process of severing a predetermined quantity of the plastic material extending below the mold.
Figure 5A:
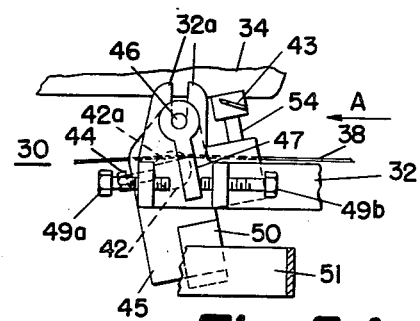
Fig. 5A is a fractional view on enlarged scale of the severing device as it is positioned in Fig. 5.

As may be seen in Figs. 5 and 5A, the mold plate 18, print block 20, carriage arms 32 and detaching device 30 are all moving in unison to the left, as indicated by arrow A. The strip of paper 38 remains at rest when the mold plate 18 is being moved by the aforementioned actuating members 27—29, Fig. 1, into position for alignment of sliding pocket 19 and print block 20 with the outlet of the chamber or filling pocket 13 for receiving a new charge of margarine. During this movement, the detaching or severing device 30 which includes frame member 45, paper-lifting bar 42 and cutting member 43, is pivoted in a counterclockwise direction, thereby moving the bar 42 into position and raising the cutting member 43. The counterclockwise movement is induced by reason of the inertia of device 30 which is pivoted near the upper portion by pivot pins 46. While the inertia of the mass below the pivot pins 46 is adequate to insure the counterclockwise movement there can also be used, as shown, the friction developed between the L-shaped members 50 against the spring-biased side tracks 51. As the counterclockwise movement is initiated, the paper web 38 is first moved against the bottom surface of the layer of pats P protruding below the bottom surface of die 34 followed by engagement of the cutting member 43 with the margarine, the cutting member 43 then having been raised into contact with the bottom of the die plate during the aforementioned pivotal movement. Upon further movement of the carriage with detaching device 30 to the left, the layer of pats is severed from beneath the die 34 by cutting member 43 and the frictional drag produced by contact between members 50 and 51 in addition to the resistance of the margarine to the cutting member 43 and inertia of device 30 are effective to bias the cutting member 43 against the underside of die 34 during the cutting stroke.

As the paper-lifting member 42 is in advance of the cutting member 43, the pats are first engaged by the paper and then gently lowered below the die 34 as they are severed therefrom by means of the cutting member 43. There is no relative movement between the paper and the pats once they are brought into contact. Thus, there is prevented any deformation of the pats after they have been severed from the mass within the extrusion pocket 31 and they are transferred to the paper in the position required for subsequent wrapping as by layers.

After the detaching device 30 reaches the end of its stroke as illustrated in Fig. 6, the layer of pats is completely severed from the mass of margarine within cavity 31. At this time the various parts move from the position shown in Fig. 6 to the position shown in Fig. 3, and finally to the position shown in Fig. 4, at which time the foregoing cycle is ready to be repeated. During the movement of the various parts from the position in Fig. 6 to the position in Fig. 4, the paper strip is advanced, thereby moving the severed pats away from the position below the extrusion pocket 31 preparatory to receiving a subsequent layer of pats upon the succeeding operation of the severing device 30.

While there has been described a preferred embodiment of this invention, it will be understood that further modifications may be made without departing from the spirit and scope of the invention as set forth in the appended claims.

What is claimed is:

1. In a machine for molding and dispensing plastic material, the combination of a mold adapted to receive therein the plastic material and having an outlet, conveyor means adapted to be advanced step-by-step past the outlet of said mold, means for expelling a predetermined quantity of the plastic material from the outlet of said mold, cutting means movable across the outlet of said mold in a path substantially parallel to said conveyor means for detaching the predetermined quantity of plastic material expelled from said mold, and means cooperating with said conveyor means for lifting the conveyor means into adhesive contact with the predetermined quantity of material expelled to support the latter as it is being detached between advancement steps of said conveyor means in avoidance of deformation of the expelled material.

2. In a machine for molding and dispensing plastic material such as butter, margarine or the like, a mold adapted to receive therein a quantity of the plastic material, a flexible conveyor web passing below and spaced from said mold, plunger means forming the top of said mold and being movable axially thereof periodically to move successive portions of predetermined thickness of said quantity of the plastic material below the bottom surface of said mold, the thickness of said portions being predetermined by the axial movement of said plunger, cutting means movable transversely of the axis of said mold for detaching each portion of plastic material moved below said bottom surface of said mold and prior to advance movement of said flexible conveyor web, and means cooperating with said cutting means for lifting the flexible conveyor web into contact with the portion of material to be detached.

3. An attachment for a machine for molding plastic material and expelling it from a mold onto a conveyor comprising a device including cutting means for detaching plastic material from the mold, and lifting means movable transversely of the outlet of the mold and cooperating with said cutting means for lifting the conveyor into adhesive contact with the material whereby the conveyor prevents longitudinal shifting and deformation of said material during detachment from the mold by said cutting means, said device being adapted for passage of the conveyor between said cutting means and said lifting means.

4. An arrangement according to claim 3 wherein said device comprises a movable frame member having said cutting means and said lifting means extending thereacross, said cutting means being spaced vertically above said lifting means.

5. An arrangement according to claim 3 wherein said cutting means comprises a knife blade, and said lifting means comprises a movable bar having a flat side thereon for engaging said conveyor in advance of said knife and moving it into contact with the material.

6. In a machine for molding plastic material and expelling it from a mold onto a movable conveyor, the combination of a carriage reciprocable transversely of the outlet of the mold, cutting means pivotally carried by said carriage between the mold and the conveyor for detaching plastic material from the mold, lifting means pivotally carried by said carriage and below the conveyor, and means cooperating with said cutting means and said lifting means for rotating both said lifting means and said cutting means in one direction concurrently to lift the conveyor into contact with the bottom surface of the material to be detached from the mold and to raise said cutting means to cutting position against the bottom of the mold and upon reverse movement of said carriage for rotating said cutting means in the opposite direction to lower said cutting means from said cutting position to provide clearance between said cutting means and said mold.

7. In a machine for molding plastic material such as butter, margarine or the like, the combination of an extrusion pocket having an inlet and outlet, movable mold structure having a cavity adapted periodically to receive therein successive quantities of the plastic material for periodic transfer to the inlet of said extrusion pocket, movable conveyor means adapted to be advanced step-by-step past the outlet of said extrusion pocket, a plunger forming the top of said cavity in said mold structure, a die having a grid disposed at the outlet of said extrusion pocket, said plunger being movable in said cavity periodically to move successive quantities of the plastic material through the grid of said die, cutting means movable transversely of said outlet for detaching each quantity of plastic material moved through said die, and lifting means cooperating with said cutting means for moving said conveyor means into contact with the material being detached between advancement steps of said conveyor means.

8. An attachment for a machine for molding plastic material and expelling it from a mold onto a conveyor comprising a device including movable cutting means for detaching plastic material from the mold, and means movable with said cutting means relative to the conveyor for progressively supporting the conveyor in stationary contact with said material during progressive detachment from the mold by said cutting means, said device being adapted for passage of the conveyor between said cutting means and said lifting means.

9. An arrangement according to claim 8 wherein said device comprises a frame member having said cutting means and said progressive supporting means extending thereacross in opposed relation and all being movable together as a unit during the progressive detachment of said material, said supporting means being spaced vertically below said cutting means and in advance thereof to provide progressive support for the material being progressively detached from the mold by said cutting means.

10. An attachment for a machine for molding plastic material and expelling it from a mold onto a flexible conveyor comprising cutting means disposed for movement between the mold and conveyor, means for moving the cutting means across the face of the mold to sever material protruding therefrom, and means driven with said cutting means including a narrow supporting member for lifting the conveyor into engaging position with the protruded material and movable with said cutting means along the exposed face of said protruded material as it is being severed from the material remaining within the mold, the flexible conveyor passing between said cutting means and said narrow supporting member.

11. The method of molding and dispensing plastic material comprising supplying plastic material to a filling chamber, periodically transferring predetermined quantities of said material from said filling chamber to a storage cavity, storing said material transferred until said storage cavity contains a plurality of said predetermined quantities and thereafter concurrently dispensing a quantity of the stored material equal to the quantity being transferred to said storage cavity by expelling in a vertical downward direction a predetermined quantity of said stored material from the interior of the storage cavity, moving a support into supporting contact with the exposed end face of said expelled quantity while said expelled quantity is at rest, and thereafter severing in a horizontal direction said expelled quantity from the remainder of the plastic material in said storage cavity prior to conveying said expelled quantity away from the storage cavity.

References Cited in the file of this patent

UNITED STATES PATENTS

| | | |
|---|---|---|
| 526,902 | Hucks | Oct. 2, 1894 |
| 798,361 | Morton | Aug. 29, 1905 |
| 1,810,864 | Vogt | June 16, 1931 |
| 2,085,108 | Louisot et al. | June 29, 1937 |
| 2,149,920 | Kretchmer | Mar. 7, 1939 |
| 2,182,656 | Bruggimann | Dec. 5, 1939 |
| 2,383,989 | Pilcher | Sept. 4, 1945 |
| 2,410,035 | Luaces | Oct. 29, 1946 |

FOREIGN PATENTS

| | | |
|---|---|---|
| 36,792 | France | Apr. 29, 1930 |
| | (First addition to No. 651,349) | |
| 293,583 | Germany | Aug. 18, 1916 |
| 467,922 | Great Britain | June 25, 1937 |
| 807,462 | France | Oct. 19, 1936 |